(12) United States Patent
Kihara

(10) Patent No.: US 9,194,623 B2
(45) Date of Patent: Nov. 24, 2015

(54) DISTILLATION DEVICE

(71) Applicant: TAIYO NIPPON SANSO CORPORATION, Tokyo (JP)

(72) Inventor: Hitoshi Kihara, Chiba (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 0 days.

(21) Appl. No.: 14/388,014

(22) PCT Filed: Mar. 19, 2013

(86) PCT No.: PCT/JP2013/057810
§ 371 (c)(1),
(2) Date: Sep. 25, 2014

(87) PCT Pub. No.: WO2013/146466
PCT Pub. Date: Oct. 3, 2013

(65) Prior Publication Data
US 2015/0068247 A1  Mar. 12, 2015

(30) Foreign Application Priority Data

Mar. 27, 2012 (JP) ................................. 2012-071598

(51) Int. Cl.
*B01D 3/14* (2006.01)
*F25J 1/00* (2006.01)
(Continued)

(52) U.S. Cl.
CPC . *F25J 1/00* (2013.01); *B01D 3/146* (2013.01); *B01D 59/04* (2013.01); *F25J 3/08* (2013.01); *F25J 2200/08* (2013.01); *F25J 2200/10* (2013.01); *F25J 2200/70* (2013.01); *F25J 2200/72* (2013.01); *F25J 2215/42* (2013.01);
(Continued)

(58) Field of Classification Search
CPC .............................. B01D 3/146; B01D 59/04
See application file for complete search history.

(56) References Cited

U.S. PATENT DOCUMENTS

| | | | | |
|---|---|---|---|---|
| 4,428,759 A | * | 1/1984 | Ryan et al. | 62/635 |
| RE32,600 E | * | 2/1988 | Ryan et al. | 62/635 |
| 5,992,175 A | * | 11/1999 | Yao et al. | 62/621 |

(Continued)

FOREIGN PATENT DOCUMENTS

| | | |
|---|---|---|
| JP | 62-298402 | 12/1987 |
| JP | 2001-104756 | 4/2001 |

(Continued)

OTHER PUBLICATIONS

International Search Report for PCT/JP2013/057810, mailed Jun. 18, 2013.

(Continued)

*Primary Examiner* — Renee E Robinson
*Assistant Examiner* — Jonathan Miller
(74) *Attorney, Agent, or Firm* — Nixon & Vanderhye P.C.

(57) ABSTRACT

A distillation apparatus includes: a distillation column group in which a plurality of distillation columns, which are respectively equipped with a reboiler, is connected in the form of a distillation cascade; feed-gas condensers which liquefy feed gases from respective former distillation columns and feed said liquefied feed gases to respective latter distillation columns; gas-feeding lines which connect the respective former distillation columns and the respective feed-gas condensers; and liquid-feeding lines which connect the respective feed-gas condensers and the respective latter distillation columns.

3 Claims, 9 Drawing Sheets

(51) Int. Cl.
*B01D 59/04* (2006.01)
*F25J 3/08* (2006.01)

(52) U.S. Cl.
CPC ........... *F25J 2215/50* (2013.01); *F25J 2220/90* (2013.01)

(56) References Cited

U.S. PATENT DOCUMENTS

| | | | |
|---|---|---|---|
| 6,539,748 B2 * | 4/2003 | Prentice et al. | 62/654 |
| 6,560,989 B1 * | 5/2003 | Roberts et al. | 62/623 |
| 6,835,287 B1 * | 12/2004 | Kihara et al. | 202/154 |
| 7,828,939 B2 * | 11/2010 | Kihara et al. | 203/5 |
| 7,922,872 B2 * | 4/2011 | Kihara et al. | 202/154 |
| 2009/0282864 A1 * | 11/2009 | Malsam | 62/620 |
| 2010/0223950 A1 * | 9/2010 | Malsam | 62/611 |

FOREIGN PATENT DOCUMENTS

| | | |
|---|---|---|
| JP | 2001-192202 | 7/2001 |
| JP | 2001-239101 | 9/2001 |
| JP | 2008-132418 | 6/2008 |
| JP | B-4495279 | 6/2010 |
| WO | WO 2007/122893 | 11/2007 |

OTHER PUBLICATIONS

Foreign-language Written Opinion of the ISA for PCT/JP2013/057810, mailed Jun. 18, 2013.

Notice of Allowance for JP 2012-071598 dated Oct. 9, 2012.

* cited by examiner

PRIOR ART

PRIOR ART

DISTILLATION DEVICE

TECHNICAL FIELD

The present invention relates to a distillation apparatus for performing distillation of a cryogenic fluid, in which a plurality of distillation columns is connected in the form of a cascade. Specifically, the present invention relates to a distillation apparatus which is suitable for enrichment of stable isotopes of carbon, nitrogen and oxygen, etc. which exist in only little amounts in nature.

This application is the U.S. national phase of International Application No. PCT/JP2013/057810 filed 19 Mar. 2013 which designated the U.S. and claims priority to Japanese Patent Application No. 2012-071598, filed Mar. 27, 2012, the entire contents of each of which are incorporated herein by reference.

BACKGROUND ART

Stable isotopes ($^{13}C$, $^{15}N$, $^{17}O$ and $^{18}O$, etc.) of carbon, nitrogen and oxygen, etc. are used as a tracer in the fields of natural science and medical care. As an enrichment method of these isotopes which exist in only little amounts in nature, there is a cascade process which uses a plurality of distillation columns.

Cascade means connecting a plurality of distillation columns in series. In order to continuously concentrate a specific component in raw materials, the component concentrated in a distillation column is further concentrated in a latter distillation column, and again concentrated in a further latter distillation column. That is, a continuous distillation process is performed by a plurality of distillation columns. In this respect, a cascade process is different from a process seen in a general chemical process, which combines a plurality of distillation columns in which a component to be concentrated is different from the others.

A cascade process is a technique which is mainly used in the field of isotope enrichment. This cascade process enables enrichment by distillation for a structural isomer or an isotope or isotopologue which has a separation factor (or relative volatility) of almost 1, requires a very large number of theoretical plates, and is difficult to be separated.

Hereinafter, an example of a conventional cascade process is described.

In a cascade process, as a method of exchanging a material between adjacent distillation columns, i.e. a connection method, there are methods shown in FIG. 4 to FIG. 7.

The distillation apparatus shown in FIG. 4 is an example of the simplest distillation cascade. This example of a distillation apparatus is composed of a distillation column group in which 6 distillation columns D1 to D6 are connected in series. The distillation columns D1 to D3 constitute a stripping section, and the distillation columns D3 to D6 constitute an enriching section. In the distillation columns D1 and D2, the condensers C1 and C2 are provided on the tops thereof. In the distillation column D4 to D6, the reboilers R4 to R6 are provided on the bottoms thereof. In the distillation columns D3, the condenser C3 is provided on the top thereof, and the reboiler R3 is provided on the bottom thereof.

A feed gas F is fed into the distillation column D3. Then, the desired component is concentrated and withdrawn from the bottom part of the distillation column D6 as a product P, and the remainder is withdrawn from the top part of distillation column D1 as waste components W.

The distillation load is the largest in the distillation column D3 to which the feed gas F is fed. The load becomes gradually small toward the last column D6 in the enriching section and toward the first column D1 in the stripping section (that is, the column diameter becomes small).

In the example of this apparatus, the returns of gases from the last column D6 to the fifth column D5, from the fifth column D5 to the fourth column D4, . . . , and from the second column D2 to the first column D1 are performed by using pressure differences. Therefore, the pressure of a distillation column needs to be higher toward the last column D6 from the first column D1. As a result, a separation factor (relative volatility) also becomes small, thereby resulting in a disadvantage with respect to distillation efficiency.

Also, when liquid pumps P1 to P5 are used to flow the liquid of a distillation column to the latter column, liquid is accumulated in the liquid pumps P1 to P5. Therefore, the liquid hold-up over the whole apparatus is increased, which is disadvantageous in that startup time is extended. Also, when a liquid pump is used in cryogenic distillation, heat inleak is increased, and thus, there is a disadvantage in this respect.

The distillation apparatus shown in FIG. 5 is another example of conventional art. The distillation columns thereof have almost the same features as the example of the apparatus shown in FIG. 4. In this example, pressures at the tops of all the distillation columns D1 to D6 are the same. Thus, it is possible to prevent pressures from increasing toward the last distillation column D6 and to prevent the separation factor from becoming smaller. However, this apparatus requires pressurizing devices such as blowers B1 to B5 are required for returning gases to the former distillation columns respectively, which is disadvantageous in reliability of the apparatus. Also, the disadvantages regarding the use of the liquid pumps P1 to P5 are not solved.

The example shown in FIG. 6 is an example of conventional art which is the developed version of the apparatus shown in FIG. 5. In a similar manner to the apparatus shown in FIG. 5, pressures at tops of all distillation columns D1 to D6 are the same. All the distillation columns D1 to D6 are equipped with the condensers C1 to C6 and the reboilers R1 to R6, and a gas is fed into the latter distillation columns by pressure differences between adjacent distillation columns (corresponding to pressure drop in the case where pressures at tops are the same).

In this apparatus, liquid pumps are not used, and thus, it is possible to decrease liquid hold-up. However, the disadvantage is not solved in that the pressurizing device such as blowers B1 to B5 are required to return gases.

The distillation apparatus shown in FIG. 7 is a modified example of the apparatus shown in FIG. 6. In this example, the blowers used for returning gases are omitted, and instead, the liquid-return lines Q1 to Q5 are respectively used to store the liquid obtained by liquefaction in condensers C2 to C6 and to return these liquid to the former distillation columns by the liquid head pressure (liquid head) therein.

In this apparatus, both the feeding and returning devices do not require a rotary machine such as a pump or a blower. Thus, reliability of this apparatus is improved, and liquid hold-up in a liquid-return line can be minimized, which is advantageous in that startup time is shortened. Also, it is advantageous that pressures of all the distillation columns D1 to D6 are low because it contributes to the increase in the separation factor. However, a condenser and a reboiler are required for each distillation column, which is disadvantageous from the view of the apparatus cost.

As described above, for the separation of isotopes, isotopologues or structural isomers, a plurality of distillation columns is connected in the form of a cascade, which is operated as if these were one distillation column. Thus, it is necessary to surely feed one or both of gas and liquid from a former distillation column to the latter distillation column through the connections between adjacent distillation columns D1 to D6. For example, in the distillation apparatus shown in FIG. 7, a part of gas existing in the bottom of the former distillation column or the vicinity thereof, or in the exit of the reboiler is surely fed to the latter distillation column through a feeding line, and is liquefied in the condenser so as to become a part of a falling liquid in the latter distillation column.

Patent Literature 1 discloses one example of the distillation apparatus shown in FIG. 7.

However, in a case where packed columns packed with structured packings are used in a distillation apparatus as shown in FIG. 6 or FIG. 7 or in the distillation apparatus disclosed in Patent Literature 1, pressure differences (driving force for flow) in gas-feeding lines are very small, and thus, the flow may become unstable.

Moreover, when the connection point between the gas-feeding line and the latter distillation column is set at the gas pipe (the entrance of the condenser) of the main body or the upper part of the distillation column, the inflow of the feed gas is interrupted by the gas flow, specifically fluctuation and dynamic pressure of the gas flow, in the gas-feeding line on the side of the latter distillation column, and there is the problem that it may be impossible to stably feed the gas. Also, the feed gas joins the top-gas of the latter distillation column, and then, the mixed gas is liquefied. A part of the liquid is returned to the former distillation column without reflux to the latter distillation column, and thus, there is the problem that it is impossible to efficiently connect the distillation columns.

This problem will be described in details with reference to FIG. 8. FIG. 8 is the same as FIG. 1 of Patent Literature 1, and illustrates the substantially same features as FIG. 7.

In the distillation apparatus shown in FIG. 8, the gas is fed from the distillation column D1 to the distillation column D2 through the gas-feeding line 12. A part of the gas at the exit of the reboiler 6 of the distillation column D1 flows to the distillation column D2 as the feed gas 104, and joins the top-gas 106 which flows in the top-gas pipe 28 of the distillation column D2 through the flow rate regulating valve 12v. The mixed gas flows into the condenser 7. The liquid generated by the condensation in the condenser 7 is refluxed to the top of the distillation column D2, and a part of the liquid is returned to the distillation column D1 through the return line 14 as the returning liquid 107.

In this distillation apparatus, the flow rate of the top-gas 106 is generally several to tens times as high as that of the feed gas 104. For this reason, the join of the both gases occurs in the manner that a small amount of the feed gas 104 flows into a large amount of the top-gas 106, and this inflow of the feed gas 104 may be problematic due to the dynamic pressure, etc. of the flow of the top-gas 106. This effect on the flow is significant specifically in the case where a packed column packed with structured packing is used as the respective distillation columns D1 and D2 because the driving force of the feed gas 104 is very small and within a range from several kPa to ten and several kPa.

Moreover, the feed gas 104 joins the top-gas 106, the both gases are mixed together, and the mixed gas is condensed in the condenser 7. Then, a part of the liquid is returned to the distillation column D1 through the return line 14 as the returning liquid 107. As a result, a part of the feed gas 104 is returned to the distillation column D1 as a part of the returning liquid 107 without being fed to the distillation column D2.

Although FIG. 8 illustrates that the feed gas 104 joins the top-gas 106 in the pipe, the same problem occurs in the case where the gas-feeding line is directly connected to the upper part of the distillation column as shown in FIG. 7.

CITATION LIST

Patent Literature

[Patent Literature 1]
  Japanese Patent No. 4495279

SUMMARY OF INVENTION

Technical Problem

The present invention has been made in view of the above-mentioned circumstances, and an object thereof is to provide a distillation apparatus for a cascade process which is used for enrichment of an isotope or an isotopologue, in which a plurality of distillation columns is connected in series, the feed gas is surely fed from the former distillation column to the latter distillation column, and moreover, is condensed into the falling liquid (the reflux liquid) in the latter distillation apparatus so as to surely establish the distillation cascade.

Solution to Problem

In order to achieve the aforementioned objects, the present invention was completed as follows.

The present invention is a distillation apparatus includes:
  a distillation column group in which a plurality of distillation columns, which are respectively equipped with a reboiler, are connected in the form a distillation cascade;
  feed-gas condensers which liquefy feed gases from respective former distillation columns and feed the liquefied feed gases to respective latter distillation columns;
  gas-feeding lines which connect the respective former distillation columns and the respective feed-gas condensers;
  liquid-feeding lines which connect the respective feed-gas condensers and the respective latter distillation columns;
  top-gas condensers provided on the tops of the respective distillation columns;
  top-gas lines which introduce gases from the respective distillation columns to the respective top-gas condensers;
  liquid lines which withdraw condensate liquids from the respective top-gas condensers;
  liquid-reflux lines which introduce the condensate liquids from the respective liquid lines to the respective distillation columns; and
  liquid-return lines which return parts of the condensate liquids from the respective liquid lines to the respective former distillation columns.

Also, it is preferable in the present invention that cooling fluids fed to the respective feed-gas condensers and cooling fluids fed to the respective top-gas condensers be from a same cooling fluid source.

Moreover, it is preferable in the present invention that each of the feed-gas condensers (C'2, C'3) and each of the top-gas condensers constitute a core of a same plate heat exchanger.

Advantageous Effects of Invention

According to a distillation apparatus of the present invention, the feed gas, which flows through the gas-feeding line from the former distillation column, flows into the feed-gas condenser without being affected by the flow of the top-gas from the latter distillation column followed by the condensation thereof, and all of the generated liquid is fed directly to the top of the latter distillation column as reflux liquid.

Moreover, the dew point of the feed gas is higher than the dew point of the top-gas due to the process. Thus, the temperature difference between the feed gas and the cooling fluid of the feed-gas condenser is much increased by separating the condenser of each of the distillation columns into the feed-gas condenser and the top-gas condenser, which results in the better flow.

Accordingly, the material exchange is surely performed among the distillation columns constituting the cascade (i.e. sending a part of the heavy component of the enriched isotope or isotopologue or the enriched structural isomer from the former distillation column to the latter distillation column, and returning a part of the aforementioned depleted component from the latter distillation column to the former distillation column). Thus, it is possible to efficiently perform a series of distillations.

Accordingly, the productivity can be improved in the separation and enrichment for the mixture which has a small separation ratio such as structural isomers, isotopes or isotopologues.

DESCRIPTION OF EMBODIMENTS

Figure 1:
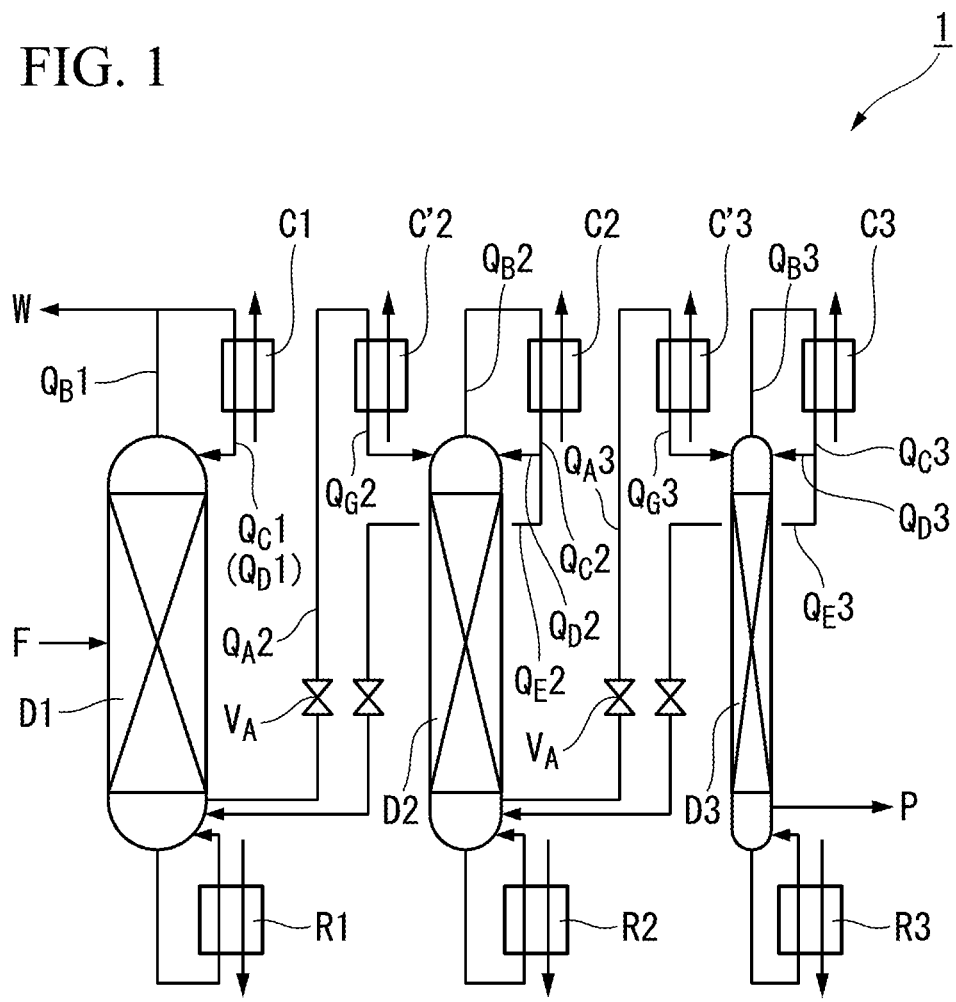
FIG. 1 is a schematic diagram illustrating a distillation apparatus of the present invention.

Hereinafter, the distillation apparatus of an embodiment of the present invention is described with reference to the drawings. The characteristic parts may enlarged and illustrated in the drawings used for the following description in order to be easily understandable, and the sizes and proportions of the respective constitutional elements do not necessarily correspond to the actual elements.

FIG. 1 is a schematic diagram illustrating the distillation apparatus used for cryogenic separation of isotopes or isotopologues, which is an embodiment of the present invention.

As shown in FIG. 1, the distillation apparatus of the present embodiment is roughly comprised of: a distillation column group in which a plurality of distillation columns D1, D2, D3, which are respectively equipped with a reboiler R1, R2, R3 at the bottom, are connected in the form of a distillation cascade; feed-gas condensers C'2, C'3 which liquefy and feed gases from respective former distillation columns D1, D2 to respective latter distillation columns D2, D3; gas-feeding lines $Q_A2$, $Q_A3$ which connect the respective former distillation columns D1, D2 and the respective feed-gas condensers C'2, C'3; liquid-feeding lines $Q_G2$, $Q_G3$ which connect the respective feed-gas condensers C'2, C'3 and the respective latter distillation columns D2, D3; top-gas condensers C1, C2, C3 provided on the tops of the respective distillation columns D1, D2, D3; top-gas lines $Q_B1$, $Q_B2$, $Q_B3$ which introduce gases from the respective distillation columns D1, D2, D3 to the respective top-gas condensers C1, C2, C3; liquid lines $Q_C1$, $Q_C2$, $Q_C3$ which withdraw condensate liquids from the respective top-gas condensers C1, C2, C3; liquid-reflux lines $Q_D1$, $Q_D2$, $Q_D3$ which introduce the condensate liquids from the respective liquid lines $Q_C1$, $Q_C2$, $Q_C3$ to the respective distillation columns D1, D2, D3; and liquid-return lines $Q_E1$, $Q_E2$, $Q_E3$ which return parts of the condensate liquids from the respective liquid lines $Q_C2$, $Q_C3$ to the respective former distillation columns D1, D2.

The respective distillation columns D1 to D3 constitute an enriching section. Also, pressures at tops of all distillation columns D1 to D3 are decreased. All the distillation columns D1 to D3 are equipped with the condensers C1 to C3 and the reboilers R1 to R3, and a gas is fed into the latter distillation columns by the pressure difference between adjacent distillation columns (corresponding to pressure drop in the case where pressures at tops are the same). Moreover, the liquid obtained by liquefaction in the condensers C1 to C3 is stored in the liquid-return lines $Q_E2$ to $Q_E3$ and returned to the former distillation columns by the liquid head pressure (liquid head) therein.

In the distillation apparatus 1, a feed gas F is fed into the distillation column D1. Then, the desired component is concentrated and withdrawn from the bottom part of the distillation column D3 as a product P, and the remainder is withdrawn from the top part of distillation column D1 as waste components W.

Figure 2:
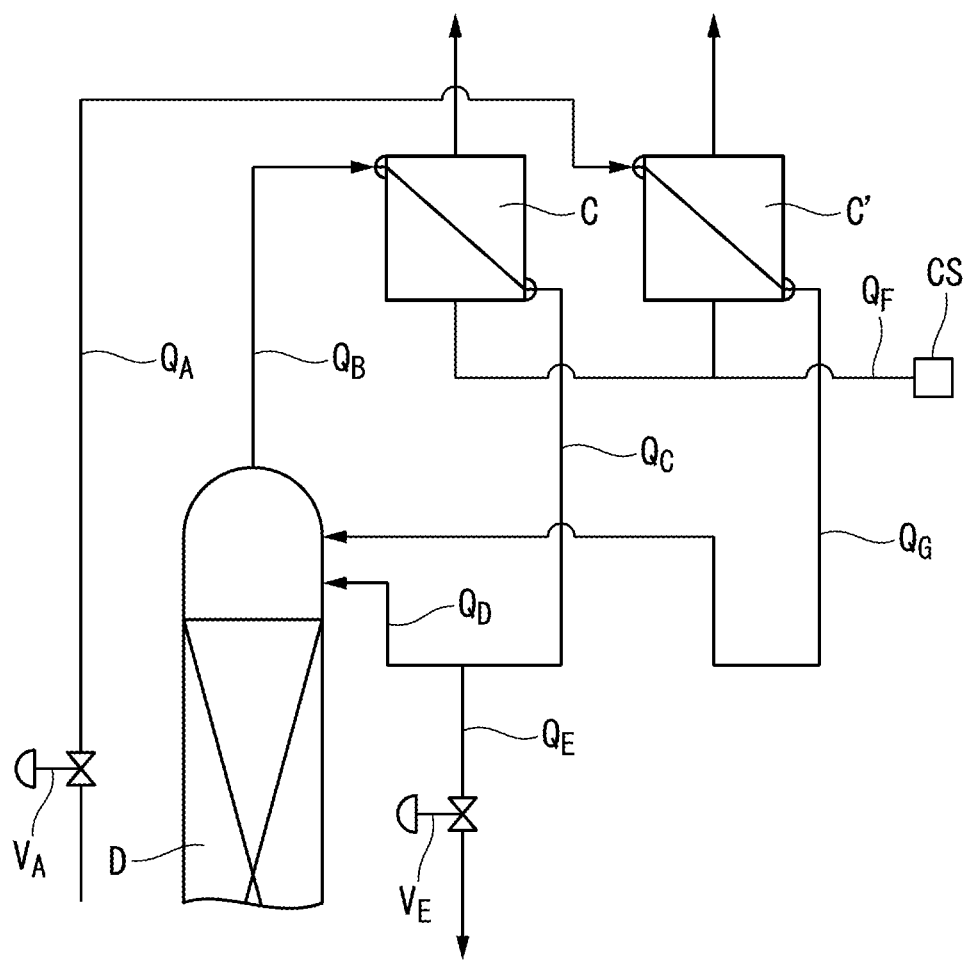
FIG. 2 is a schematic diagram illustrating a main part of a distillation apparatus of an embodiment of the present invention.

FIG. 2 is the enlarged illustration of the top of a certain distillation column D in the distillation apparatus 1 shown in FIG. 1.

As shown in FIG. 2, the feed gas from the former distillation column flows into the feed-gas condenser C' through the gas-feeding line $Q_A$ equipped with the feed-gas valve $V_A$, and is cooled by the cooling fluid. The liquefied feed gas is introduced into the top of the distillation column through the gas-feeding line $Q_C$ as the falling liquid.

Meanwhile, the rising gas within the distillation column D is introduced from the top thereof through the top-gas line $Q_B$ into the top-gas condenser C, and is cooled by the cooling fluid. The liquefied rising gas is introduced from the top-gas condenser C into the liquid line $Q_C$ as the condensate liquid.

The liquid line $Q_C$, which withdraws the condensate liquid, is biforked into the liquid-reflux line $Q_D$ and the liquid-return line $Q_E$. Thus, a part of the condensate liquid is returned to the bottom of the former distillation column through the gas-feeding line $Q_E$ equipped with the feed-gas valve $V_E$, and the reminder of the condensate liquid is introduced into the distillation column D through the liquid-reflux line $Q_D$ as the reflux liquid.

In the distillation apparatus 1 of the present embodiment, the feed gas from the former distillation column is directly introduced into the feed-gas condenser C', and thus, the driving force for the flow from the former distillation column attributes the pressure difference between the primary pressure of the feed-gas valve $V_A$ and the condensation pressure in the feed-gas condenser C'. In other words, the primary pressure of the feed-gas valve $V_A$ is almost equal to the pressure at the bottom of the former distillation column. In a packed column packed with structured packing, the pressure drop of the distillation column is very small, and thus, the pressure at the bottom of the respective distillation columns is slightly higher than the pressure at the top (by several kPa to ten and several kPa). Accordingly, the driving force for the flow (the aforementioned pressure difference) is very small.

The condensation pressure of the feed-gas condenser C' is determined by the temperature of the cooling fluid which is introduced into the feed-gas condenser C', and is not affected by the pressure fluctuation of the distillation column D. Also, the feed gas, which is a part of the bottom-gas of the former distillation column, has the higher concentration of high-boiling components and the lower condensation pressure than the top-gas of the distillation column D due to the nature of the process. Thus, when only the feed gas is introduced into the feed-gas condenser without mixing with the top-gas followed by the liquefaction thereof, it is possible to increase the pressure difference (i.e. the driving force for the flow of the feed gas) between the primary pressure of the feed-gas valve $V_A$ and the condensation pressure in the feed-gas condenser C'.

Accordingly, the driving force of the gas flow from the former distillation column can be stably ensured. As a result, the feed gas can be stably flowed into the distillation column D.

Moreover, the condensate liquid of the feed-gas condenser C' is refluxed to the top of the distillation column D through the independent line from the liquid line $Q_C$ and the reflux-liquid line $Q_D$ through which the condensate liquid of the top-gas condenser C is introduced. Therefore, contrary to the example of the conventional distillation column described below, all the amount of the feed gas contributes to the distillation cascade, and it is possible to efficiently concentrate the desired component.

As shown in FIG. 2, it is preferable in the distillation column 1 of the present embodiment that the cooling fluid fed to the feed-gas condenser C' and the cooling fluid fed to the top-gas condenser C be from the same cooling fluid source.

Figure 9:
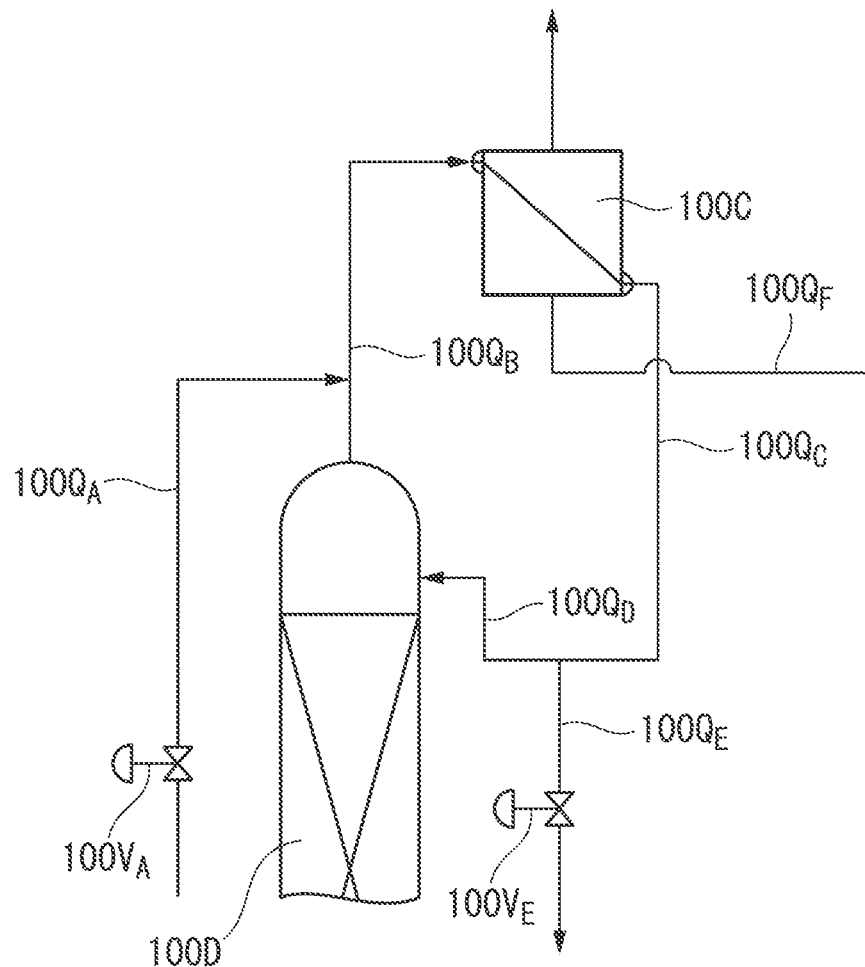
FIG. 9 is a schematic diagram illustrating a main part of a conventional distillation apparatus.

Meanwhile, FIG. 9 is the enlarged illustration of the condenser part and the top part of the distillation column constituting the conventional distillation apparatus. As shown in FIG. 9, in the conventional distillation apparatus, the liquid from the bottom part of the former distillation column is vaporized by the reboiler (unillustrated in the figure). The generated gas flows through the line 100$Q_A$ equipped with the feed-gas valve 100$V_A$, joins the gas in the top-gas line 100$Q_B$ of the distillation column 100D, and is introduced into the condenser 100C.

In the conventional distillation apparatus, the pressure difference between the primary pressure of the feed-gas valve 100$V_A$ and the pressure at the top part of the distillation column 100D is the driving force for the flow of the feed gas.

Usually, the pressure of the distillation column fluctuates within a certain controlled range. The pressure of the top-gas fluctuates according to the aforementioned fluctuation, and thus, there was the problem that the flow rate of the feed gas became unstable in the configuration of the conventional distillation apparatus in which the feed gas joined the top-gas. Specifically in the case where the driving force of the feed gas was small, such as the case of using structured packed column, the feed gas might be affected by the flow of the top-gas.

Moreover, a part of the condensate liquid of the condenser 100C is returned to the original (former) distillation column through the liquid-return line 100$Q_E$, and thus, there was the problem that a part of the feed gas from the former distillation column was not refluxed to the distillation column 100D, and did not contribute to the distillation cascade.

By contrast, according to the distillation apparatus of the present embodiment, as shown in FIG. 1 and FIG. 2, the feed-gas condenser C', which is independent from the top-gas condenser C, is provided on the gas-feeding line $Q_A$ by which the feed gas from the former distillation column is liquefied. Thus, the feed gas can be stably flowed without being affected by the pressure fluctuation of the distillation column D and the flow of the top-gas.

In other words, the feed gas from the former distillation column is introduced into the gas-feeding line $Q_A$ which is independent from the top-gas line $Q_B$ of the distillation column D, and is liquefied in the feed-gas condenser C'. Then, all the amount of the liquefied feed gas can be used as the reflux liquid of the distillation column D.

MODIFIED EXAMPLE

Figure 3:
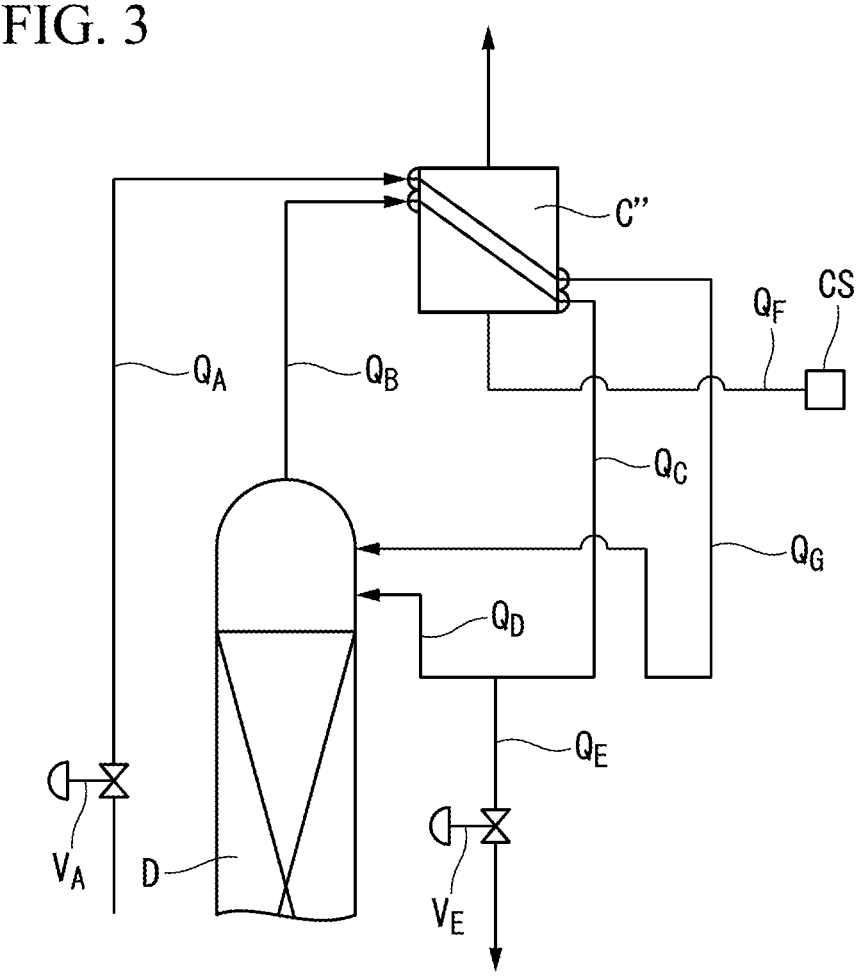
FIG. 3 is a schematic diagram illustrating a main part of a modified example of the present invention.
Figure 4:
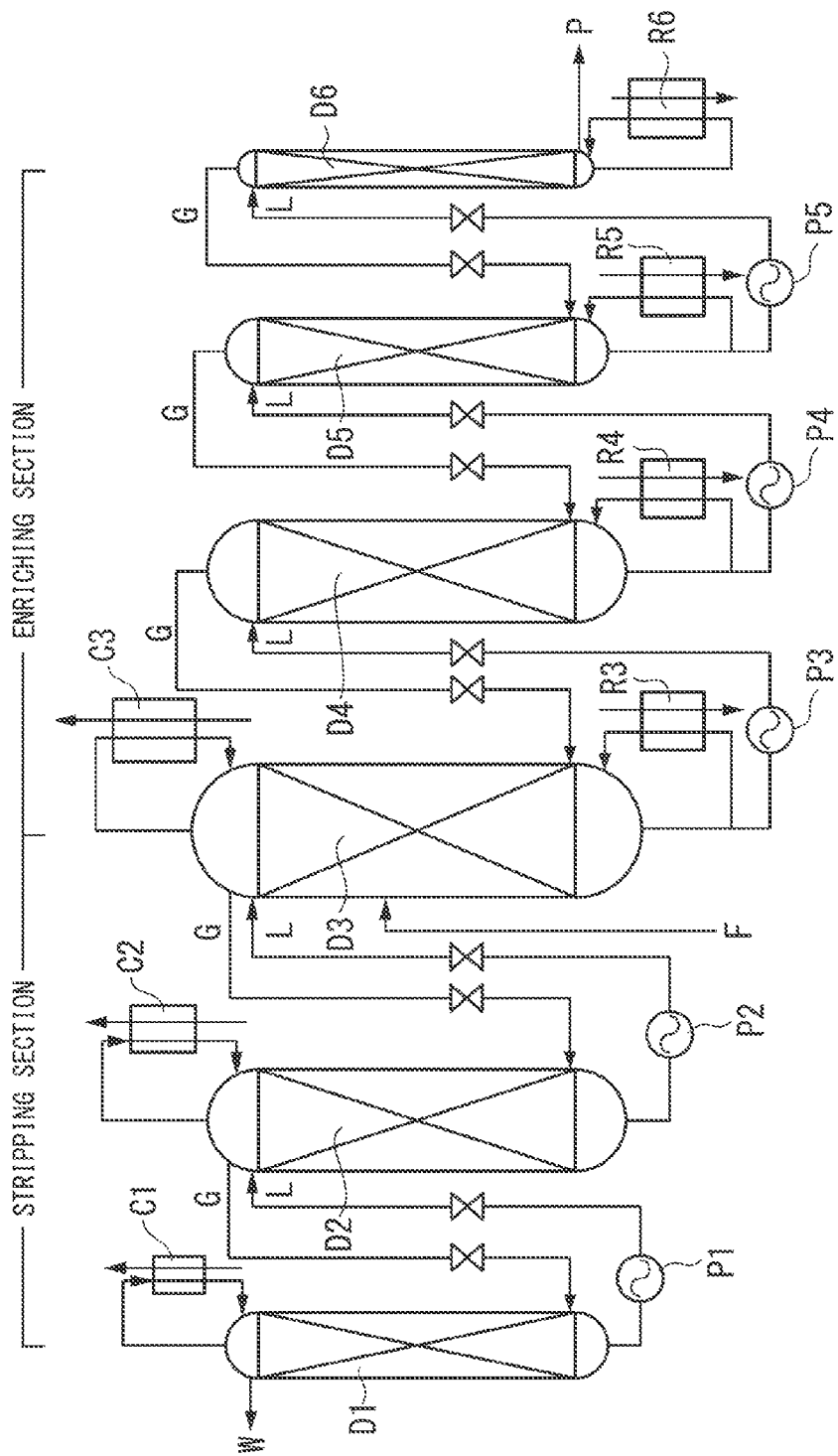
FIG. 4 is a schematic diagram illustrating a conventional distillation apparatus.
Figure 5:
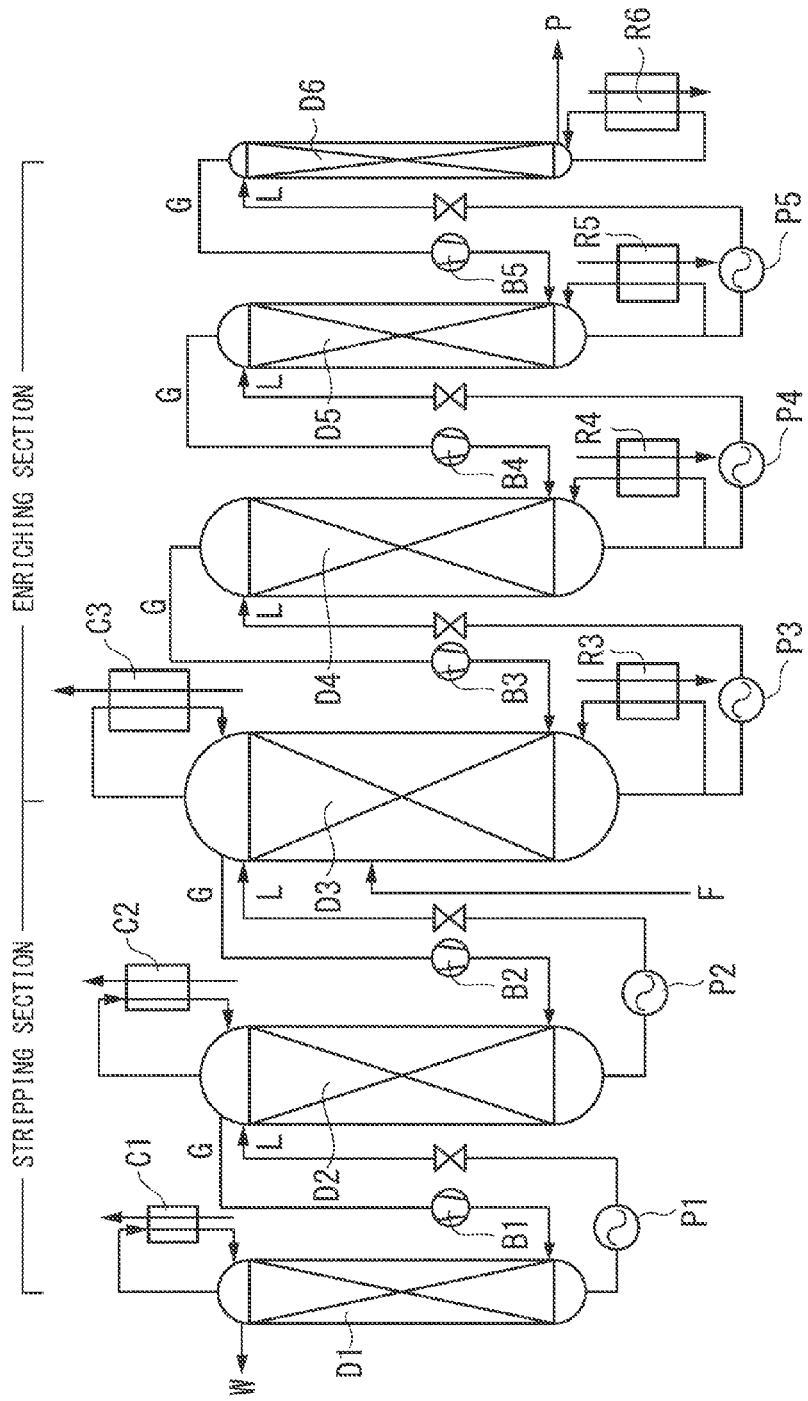
FIG. 5 is a schematic diagram illustrating a conventional distillation apparatus.
Figure 6:
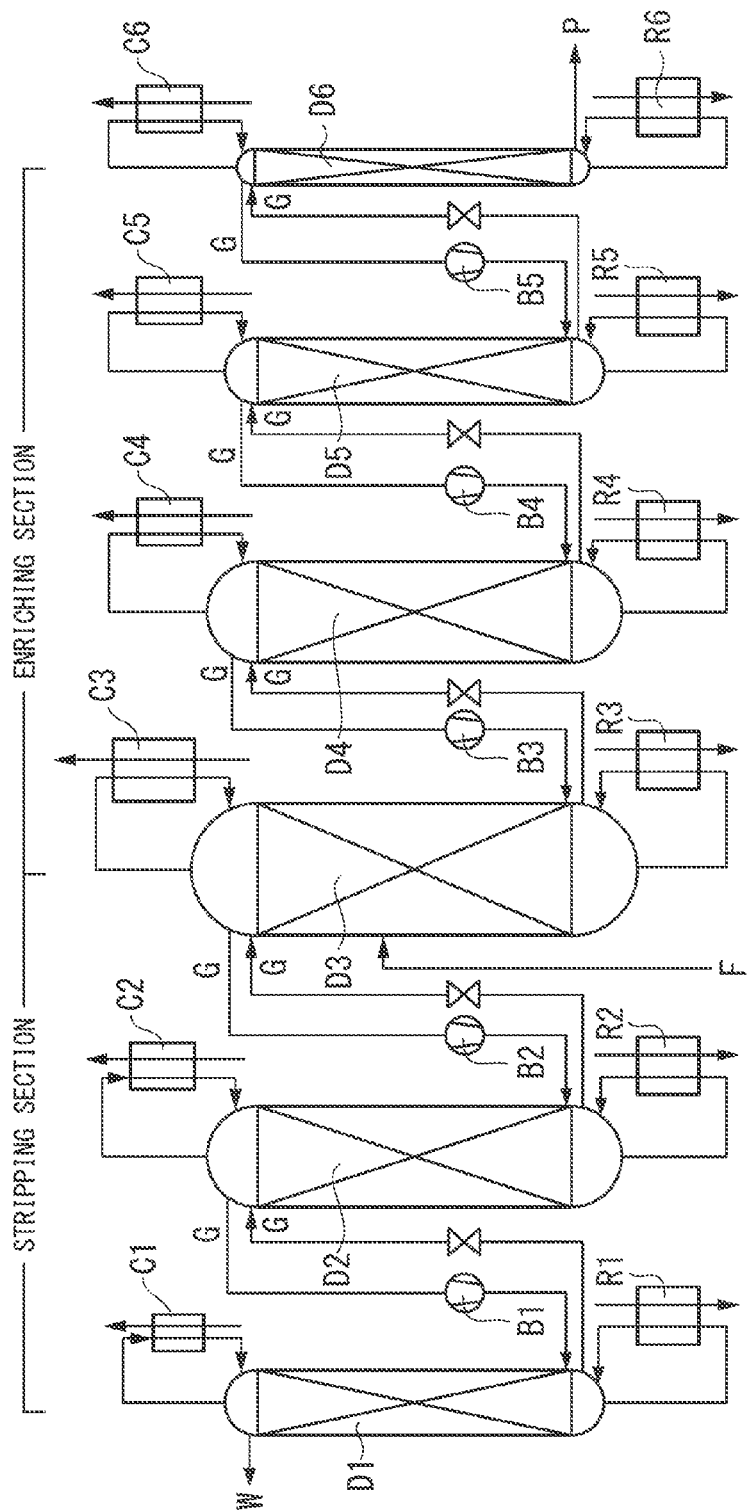
FIG. 6 is a schematic diagram illustrating a conventional distillation apparatus.
Figure 7:
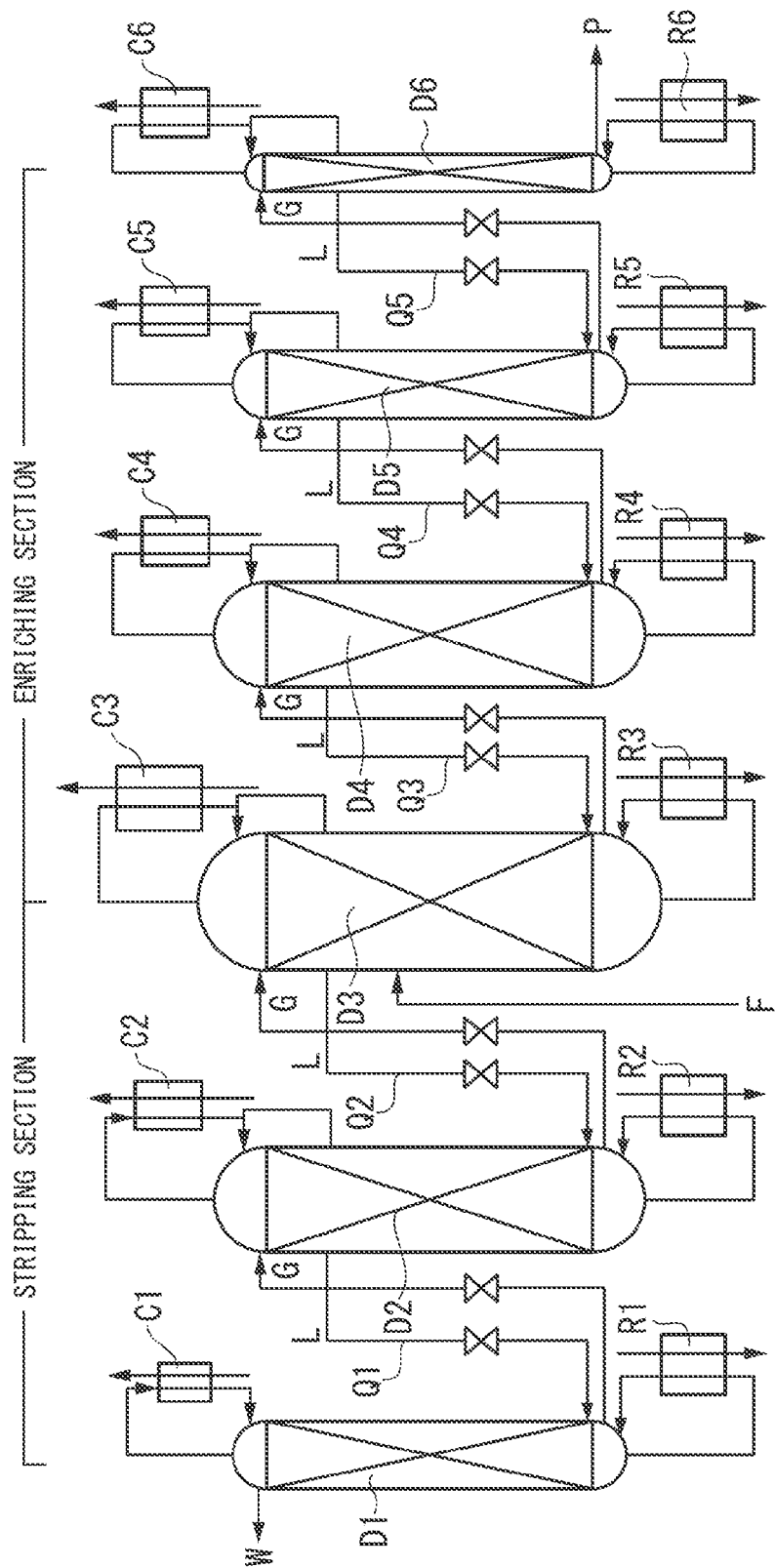
FIG. 7 is a schematic diagram illustrating a conventional distillation apparatus.
Figure 8:
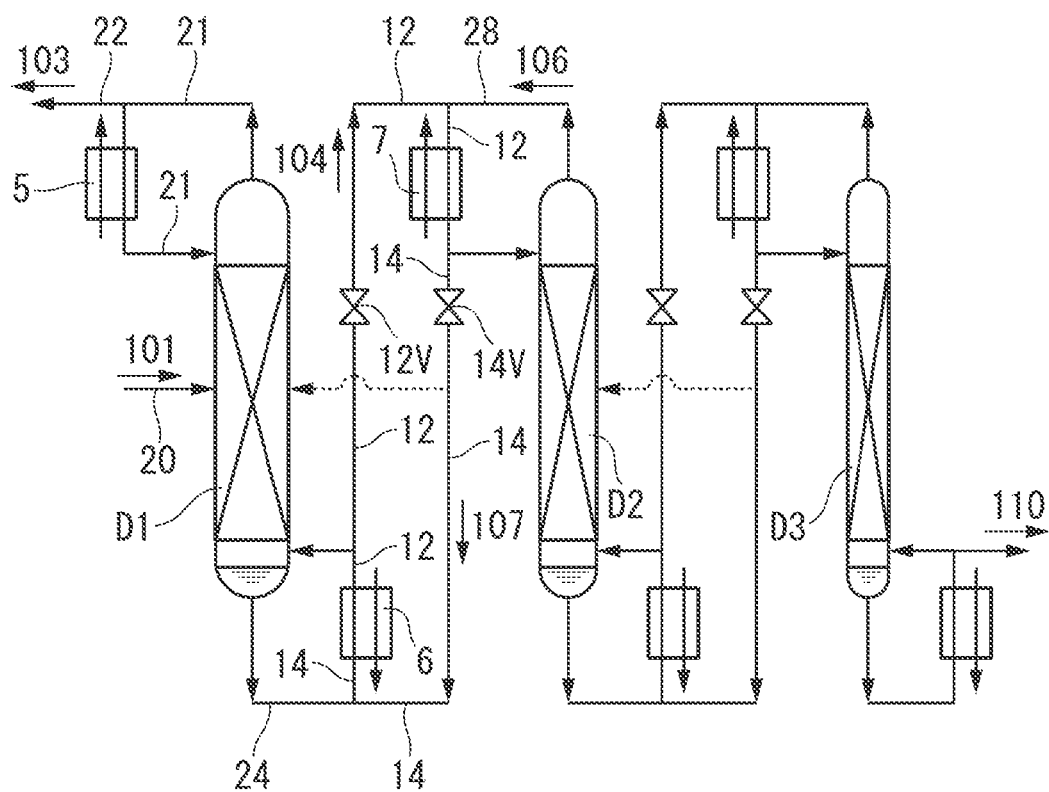
FIG. 8 is a schematic diagram illustrating a conventional distillation apparatus.

The scope of the present invention is not limited to the aforementioned embodiment, and the various modifications can be made without departing from the spirit of the present invention. For example, it is possible to use the integrated condenser C" which is configured by integrating the feed-gas condenser C' and the top-gas condenser C in the aforementioned embodiment as shown in FIG. 3. This modification can achieve the downsizing of the apparatus as well as the same technical effects as the distillation column 1 of the aforementioned embodiment.

As shown in FIG. 3, the aforementioned integrated condenser C" is the condenser in which the gas-feeding line $Q_A$ (the liquid line $Q_G$ on the exit side), the top-gas line $Q_B$ (the liquid line $Q_C$ on the exit side) and the cooling fluid line $Q_F$ are configured as the same shell or core. Both of the feed-gas condenser C' and the top-gas condenser C reflux all or a part of the condensate liquid to the same distillation column D, and thus, are located adjacent to each other. Therefore, the simplification and downsizing of the apparatus can be achieved by integrating these condensers into the integrated condenser C".

INDUSTRIAL APPLICABILITY

The present invention can be used for distillation of a cryogenic fluid, specifically a distillation apparatus to perform enrichment of stable isotopes of carbon, nitrogen and oxygen, etc. which exist in only little amounts in nature.

REFERENCE SIGNS LIST

1 Distillation apparatus
C, C1 to C3 Top-gas condenser
C', C'2 to C'3 Feed-gas condenser
C" Integrated condenser
D, D1 to D3 Distillation column
$Q_A$, $Q_A2$ to $Q_A3$ Gas-feeding line
$Q_B$, $Q_B1$ to $Q_B3$ Top-gas line
$Q_C$, $Q_C1$ to $Q_C3$ Liquid line
$Q_D$, $Q_D1$ to $Q_D3$ Liquid-reflux line
$Q_E$, $Q_E1$ to $Q_E3$ Liquid-return line
$Q_F$ Cooling fluid line
$Q_G$, $Q_G2$ to $Q_G3$ Liquid-feeding line
R1 to R3 Reboiler
CS Cooling fluid source

The invention claimed is:
1. A distillation apparatus comprising:
a distillation column group in which a plurality of distillation columns, which are respectively equipped with a reboiler, are connected in the form of a distillation cascade;

feed-gas condensers which liquefy feed gases from bottoms of respective former distillation columns and feed said liquefied feed gases to tops of respective latter distillation columns;

gas-feeding lines which connect the bottoms of the respective former distillation columns and the respective feed-gas condensers;

liquid-feeding lines which connect the respective feed-gas condensers and the tops of the respective latter distillation columns;

top-gas condensers provided on the tops of the respective distillation columns;

top-gas lines which introduce gases from the tops of the respective distillation columns to the respective top-gas condensers;

liquid lines which withdraw condensate liquids from the respective top-gas condensers;

liquid-reflux lines which introduce the condensate liquids from the respective liquid lines to the tops of the respective distillation columns; and liquid-return lines which return parts of the condensate liquids from the respective liquid lines to the bottoms of the respective former distillation columns.

2. The distillation apparatus according to claim 1, wherein cooling fluids fed to the respective feed-gas condensers and cooling fluids fed to the respective top-gas condensers are from a same cooling fluid source.

3. The distillation apparatus according to claim 1, wherein each of the feed-gas condenser and each of the top-gas condenser constitute a core of a same plate heat exchanger.

\* \* \* \* \*